United States Patent [19]

Haglund

[11] Patent Number: 5,058,717
[45] Date of Patent: Oct. 22, 1991

[54] CLUTCH AND BRAKE CONTROL CIRCUIT FOR A VEHICLE

[75] Inventor: Sam N. Haglund, East Peoria, Ill.

[73] Assignee: Caterpillar Inc., Peoria, Ill.

[21] Appl. No.: 586,121

[22] Filed: Sep. 21, 1990

[51] Int. Cl.$^5$ .............................................. F16D 67/02
[52] U.S. Cl. .................................. 192/12 C; 192/13 R
[58] Field of Search .................... 192/12 C, 12 R, 13 R

[56] References Cited

U.S. PATENT DOCUMENTS

| | | | |
|---|---|---|---|
| 2,559,195 | 7/1951 | May | 192/12 C X |
| 2,794,523 | 6/1957 | Cortelli et al. | 192/12 C |
| 3,262,525 | 7/1966 | Ehlke et al. | 192/13 |
| 3,507,212 | 4/1970 | Matteson | 192/12 C X |
| 3,815,697 | 6/1974 | Bridwell et al. | 180/6.2 |
| 3,863,744 | 2/1975 | Bridwell et al. | 192/91 R |
| 3,895,703 | 7/1975 | Schmitt et al. | 192/13 R |
| 3,899,058 | 8/1975 | Pasquini | 192/13 R |
| 3,918,488 | 11/1975 | Minami | 192/13 R X |
| 3,935,932 | 2/1976 | Moorhouse | 192/13 R |
| 4,380,249 | 4/1983 | Behlmer et al. | 192/13 R |
| 4,401,132 | 8/1983 | Hakes et al. | 137/1 |
| 4,407,328 | 10/1983 | Shore et al. | 192/12 C X |
| 4,438,780 | 3/1984 | Chatterjea | 192/13 R X |
| 4,494,621 | 1/1985 | Nagata | 192/13 C X |

Primary Examiner—Leslie A. Braun
Assistant Examiner—Nicholas Whitelaw
Attorney, Agent, or Firm—Claude F. White

[57] ABSTRACT

A fluid control circuit for controlling the disengagement of first and second drive mechanisms and the engagement of first and second brake mechanisms for a track-type vehicle has a fluid pump and first and second foot operated fluid control valves in fluid communication with the pump. Shifting of either control valve individually disengages the associated drive mechanism and engages the associated brake mechanism. Shifting of both control valves concurrently, engages both first and second brake mechanisms while the first and second drive mechanisms remain engaged. Conventional track-type vehicles use two pedals to sequentially control the disengagement of first and second drive mechanisms and the engagement of associated brake mechanisms. A third pedal controls engagement of both brake mechanisms without disengaging the drive mechanisms. The three pedals complicate the control system and create a crowded operator's station. The subject control circuit uses only two pedals to operate two control valves to disengage the drive components and engage the brakes.

10 Claims, 4 Drawing Sheets

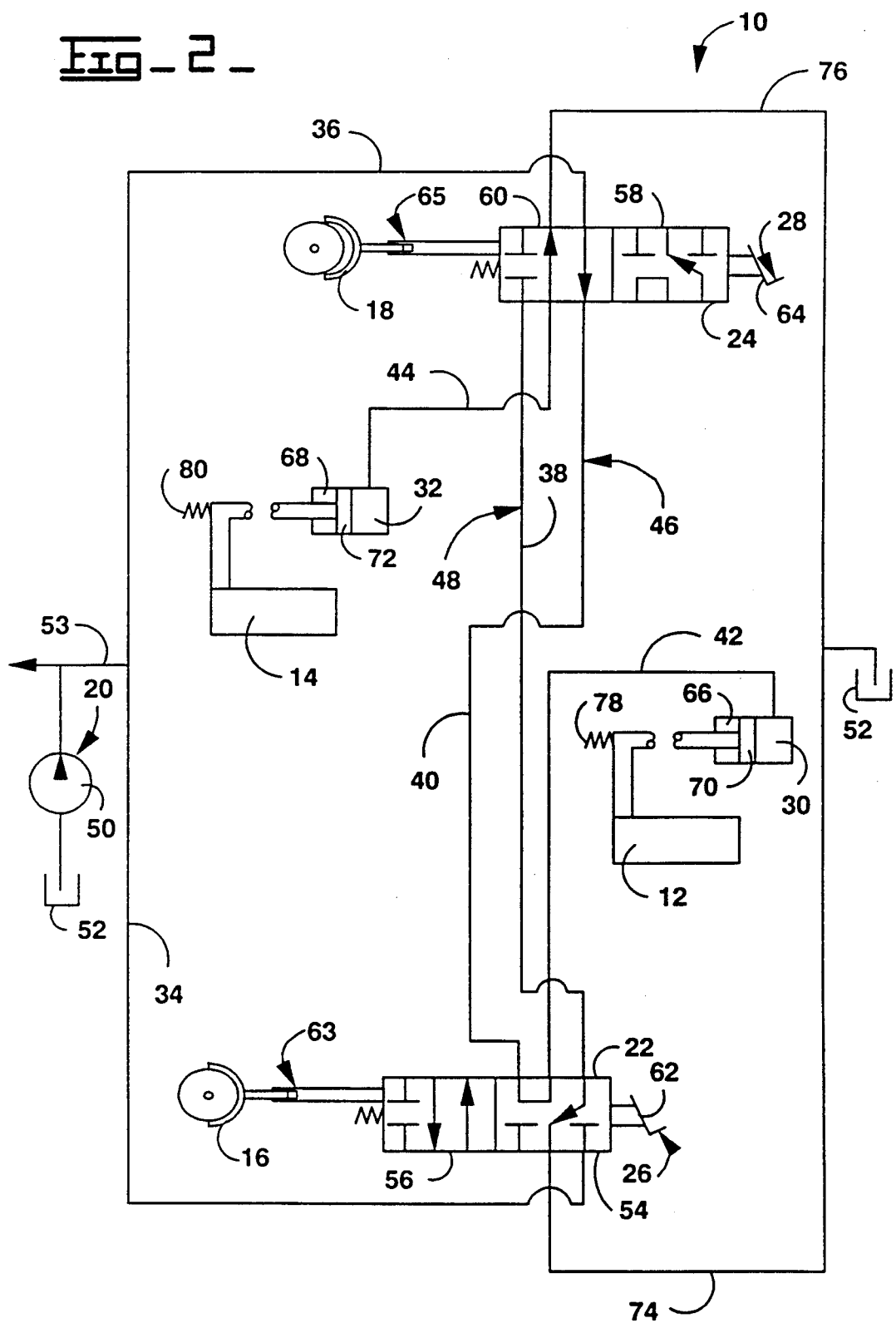

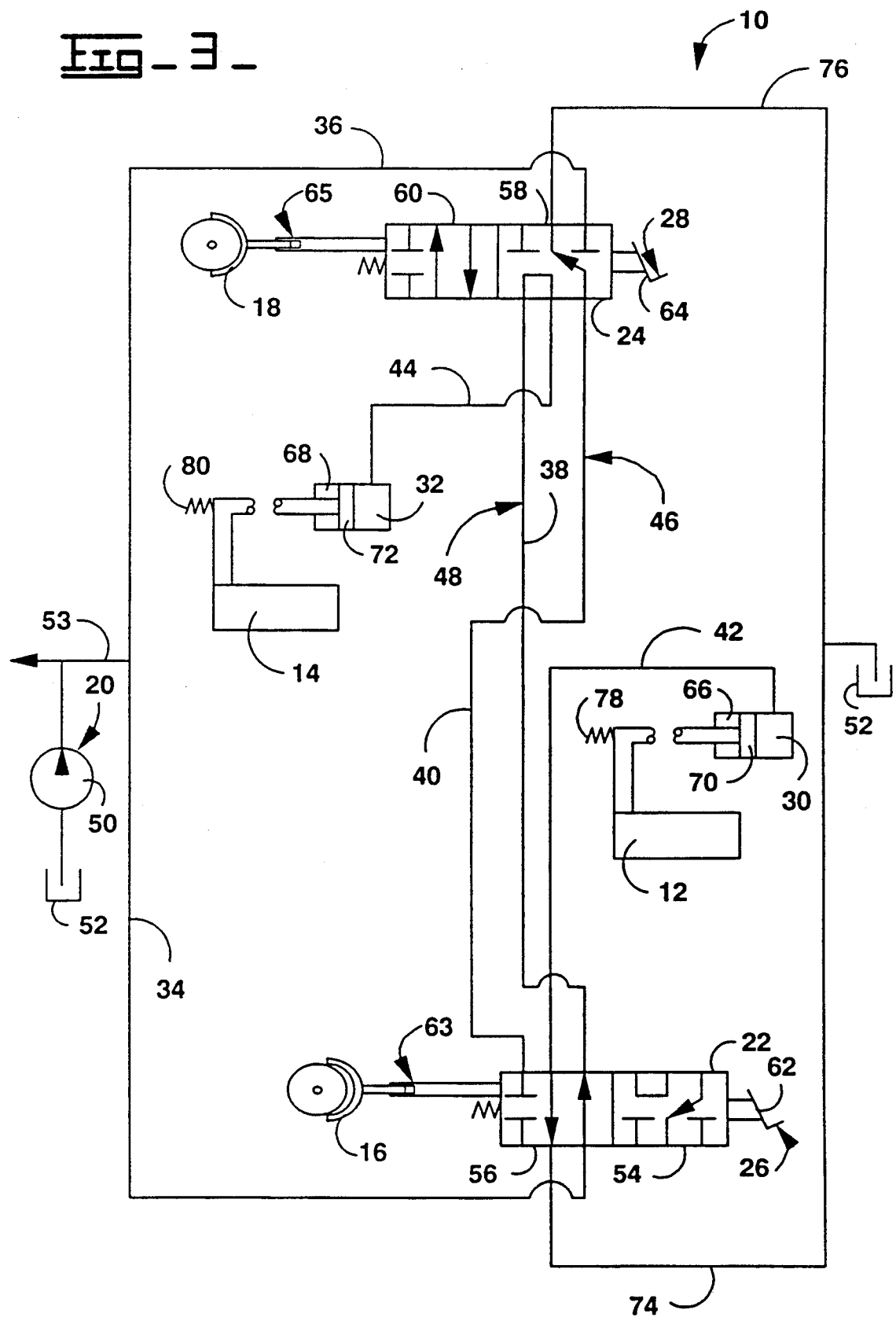
Fig-3-

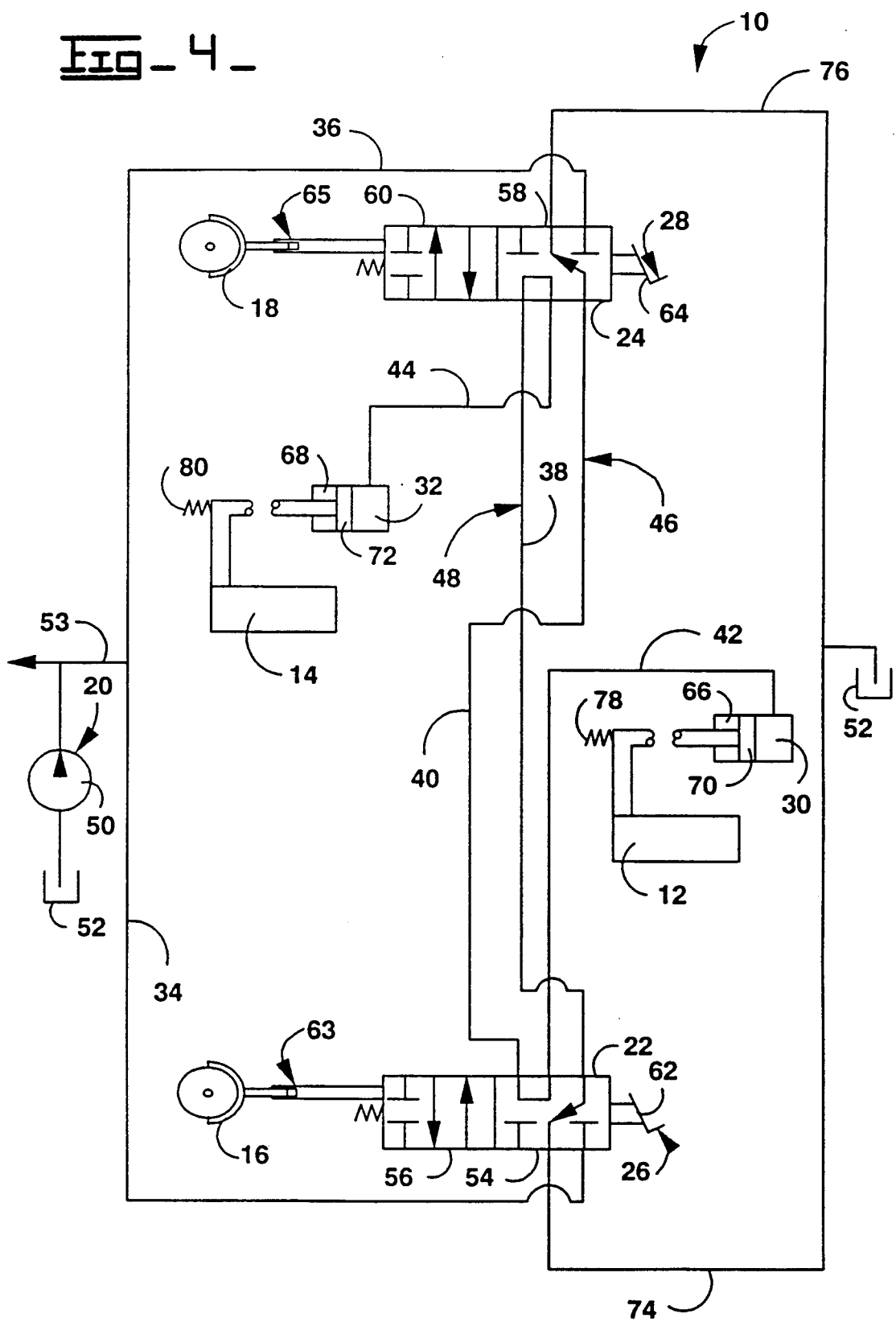

CLUTCH AND BRAKE CONTROL CIRCUIT FOR A VEHICLE

TECHNICAL FIELD

This invention relates generally to a fluid control circuit for a vehicle and more particularly to such a fluid circuit which controls the disengagement of a drive mechanism and the engagement of a brake mechanism of the vehicle.

BACKGROUND ART

Construction and earthmoving vehicles, such as track-type tractors, are normally steered by interrupting the power to the drive wheel or sprocket on one side or the other of the tractor. The steering can be assisted by applying a brake to the disconnected drive components. Conventionally, the interruption of the power and the application of the brake is sequentially accomplished by a single foot operated pedal control. A first pedal controls steering to the right and a separate second pedal controls steering to the left. Most track-type tractors included a third foot operated pedal for applying brakes to both left and right drive components without disconnecting the power to the drive components. Some prior systems utilized mechanical controls to operate the steering and brake functions while others used a combination of mechanical and hydraulic control systems.

One type of steering clutch and brake control system is disclosed in U.S. Pat. No. 3,815,697, issued to J. W. Bridwell et al. on June 11, 1974. In this patent, left and right foot pedals actuates hydraulic valves to signal hydraulic motors to disengage the steering clutches, and the same pedals sequentially bear upon the valve housings to mechanically engage the corresponding steering brake. A third center mounted pedal can be independently actuated to simultaneously engage the brakes on both drive components.

Another type of steering clutch and brake control system is disclosed in U.S. Pat. No. 3,899,058, issued to D. Pasquini on Aug. 12, 1975. In this patent, a pair of hydraulic booster valves cooperate with a flow control valve for controlling fluid flow to the steering components of the vehicle. The booster valves and the flow control valve are arranged within the system for combined sequential control of the clutching and braking functions of each track of the vehicle by selective operation of a control lever associated with each booster valve. The system permits an independent braking function by simultaneous operation of the control levers to apply the brake mechanisms on both drive components. The clutches which engage the drive components remain engaged during the independent braking function of both brakes.

Each of the above-noted steering clutch and brake control systems would appear to operate satisfactorily in controlling the steering and braking functions of a vehicle. However, each system contains structural components which could be eliminated in order to simplify the system.

The present invention is directed to overcoming one or more of the problems as set forth above.

DISCLOSURE OF THE INVENTION

In one aspect of the present invention, a fluid control circuit for controlling the disengagement of a drive mechanism and the engagement of a brake mechanism for a vehicle includes a source of pressurized fluid, first and second control valves, first and second means for actuating the first and second control valves, first and second drive disengaging mechanisms, and first and second brake mechanisms. The fluid circuit further includes a plurality of fluid lines connecting the fluid source to the control valves, connecting the first control valve to the second control valve, and connecting the drive disengaging mechanisms to the control valves. The fluid circuit also includes a first activating means for actuating the first drive disengaging mechanism and a second activating means for activating the second drive disengaging mechanism. The first activating means includes pressurized fluid routed to the first drive disengaging mechanism through the second control valve and subsequently through the first control valve, and the second activating means includes pressurized fluid routed to the second drive disconnecting mechanism through the first control valve and subsequently through the second control valve.

In another aspect of the present invention, the drive disconnecting devices include first and second fluid actuated cylinders and each of the control valves has first and second fluid control positions. The pressurized fluid is blocked to the first and second cylinders when the control valves are in the second control positions concurrently.

Track-type tractors have generally been steered using a combination of steering clutches and steering brakes. Gradual steering is accomplished by disconnecting the power drive on one side of the vehicle by disengaging the respective steering clutch. The steering can be increased by applying a steering brake to the disconnected drive component. Conventionally, a right foot operated pedal controls disengagement of the right steering clutch and subsequent application of the right steering brake. In a similar manner a left foot operated pedal controls disengagement of the left steering clutch and subsequent application of the left steering brake. A separate foot operated pedal, normally positioned between the right and left steering clutch pedals, may apply both left and right brakes without disengaging the steering clutches. In small track-type machines, the three foot operated pedals create a crowded operator's station and complicate the operation of the machine. The subject invention provides a steering clutch and brake control having only two foot operated pedals which operate two fluid control valves. The control valves disconnect the steering clutches and actuate the steering brakes sequentially when one or the other of the pedals is activated. When both pedals are activated concurrently, both brakes are actuated while the steering clutches remain engaged. The third pedal is eliminated which provides easier machine control and a less crowded operator's station.

BRIEF DESCRIPTION OF THE DRAWINGS

FIG. 2 is a schematic illustration of a control circuit, similar to FIG. 1 with a first clutch shown disengaged and the corresponding first brake shown engaged;

FIG. 3 is a schematic illustration of a control circuit, similar to FIG. 1, with a second clutch shown disengaged and the corresponding second brake shown engaged; and FIG. 4 is a schematic illustration of a control circuit, similar to FIG. 1, with the first and second clutches shown engaged and the first and second brakes shown engaged.

BEST MODE FOR CARRYING OUT THE INVENTION

Figure 1:
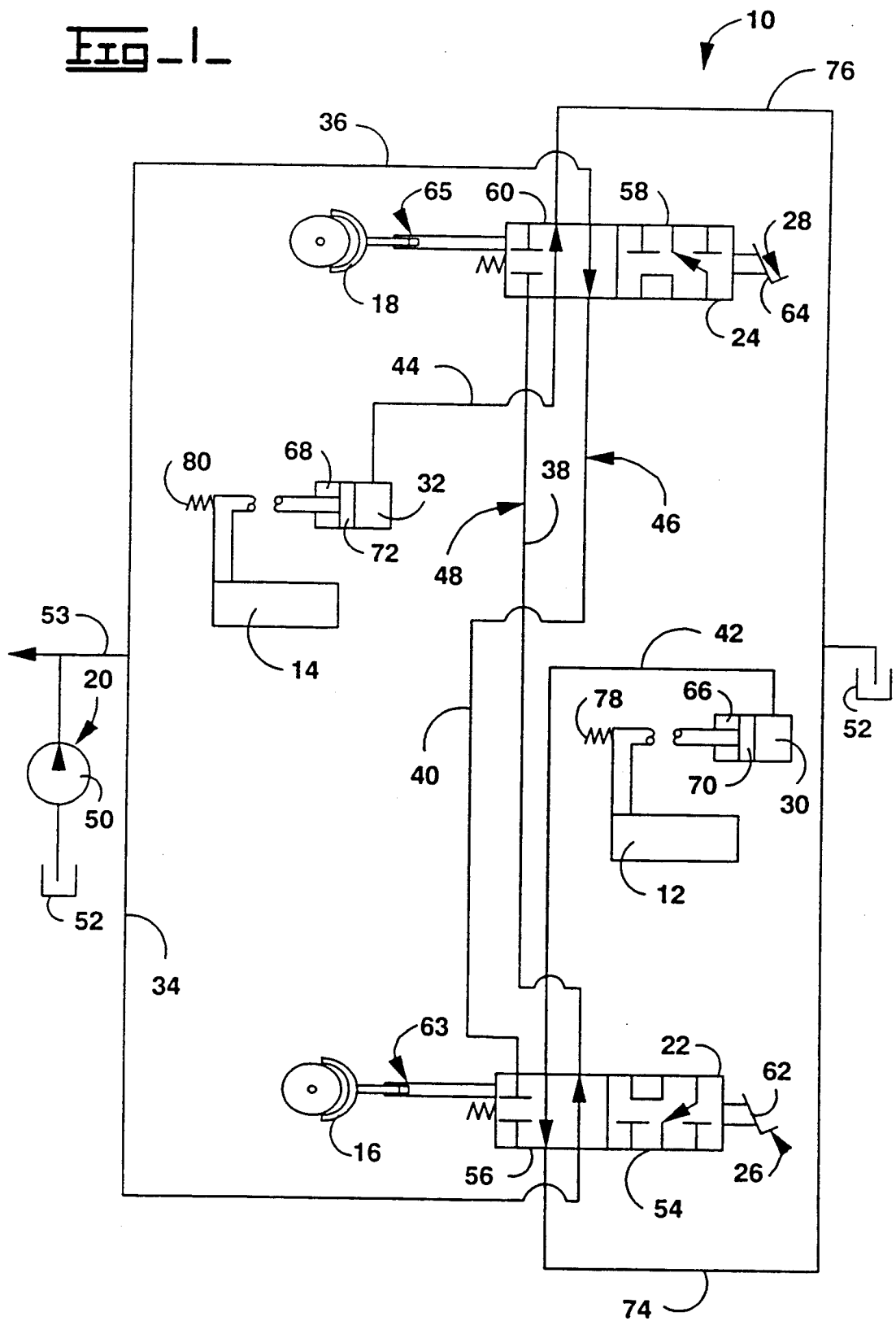
FIG. 1 is a schematic illustration of a steering clutch and brake control circuit of the present invention, with the first and second clutches shown engaged and the first and second brakes shown disengaged.

Referring to the drawings, a fluid control circuit 10 for controlling the disengagement of first and second drive mechanism 12,14 and the engagement of first and second brake mechanisms 16,18 for a vehicle includes a source of pressurized fluid 20, first and second fluid control valves 22,24, first and second means 26,28 for actuating respectively the first and second control valves 22,24, first and second drive mechanisms 12,14 first and second drive disengaging mechanism 30,32, and first and second brake mechanisms 16,18. The fluid control circuit 10 further includes first and second fluid lines 34,36 which connect the fluid source 20 respectively to the first and second control valves 22,24, third and fourth fluid lines 38,40 which connect the first control valve 22 to the second control valve 24, and fifth and sixth fluid lines 42,44 which connect the first and second drive disengaging mechanism 30,32 respectively to the first and second control valves 22,24.

The fluid control circuit 10 also includes a first means 46 for activating the first drive disengaging mechanism 30, and a second means 48 for activating the second drive disengaging mechanism 32. The first activating means 46 includes pressurized fluid routed to the first drive disengaging mechanism 30 sequentially through the second control valve 24 and then through the first control valve 22. The second activating means 48 includes pressurized fluid routed to the second drive disengaging mechanism 32 sequentially through the first control valve 22 and then through the second control valve 24.

The source of pressurized fluid 20 includes a single fluid pump 50 and a fluid reservoir 52. The fluid pump 50 is adapted to supply pressurized fluid to other vehicle circuits through the fluid line 53. The first control valve 22 has first and second control positions 54,56 and the second control valve 24 has first and second control positions 58,60. The first and second actuating means 26,28 include respectively first and second valve actuating foot operated pedals 62,64 connected respectively to the first and second fluid control valves 22,24. The first and second foot pedals 62,64 are also connected respectively to the first and second brake mechanisms 16,18. First and second lost motion devices 63,65 associated respectively with the first and second brake mechanisms 16,18 provide that each of the control valves 22,24 can be moved a pre-determined distance from the first positions 54,58 toward the second positions 56,60 respectively before the brake mechanisms are activated. The first and second drive disengaging mechanisms 30,32 include first and second fluid actuated cylinder 66,68 and pistons 70,72 respectively. The cylinder 66 is connected to the fluid reservoir 52 through the line 42, the first control valve 22, and a first drain line 74 when the first control valve 22 is in the second control position. The cylinder 68 is connected to the fluid reservoir 52 through the line 44, the second control valve 24, and a second drain line 76 when the second control valve 24 is in the second control position. When either of the control valves 22,24 is in the second control positions 56,60, the respective drive disengaging mechanism 30,32 is de-activated and the respective drive mechanism 12,14 is engaged. First and second springs 78,80 return the pistons 70,72 to a de-activated position when the cylinders 66,68 are connected to the reservoir 52.

Industrial Applicability

With reference to the drawings, the subject clutch and brake control circuit is particularly useful with track-type vehicles, but can be advantageously utilized with any type of vehicle which uses steering clutches and steering brakes.

With particular reference to FIG. 1, the control circuit 10 illustrates the first and second drive mechanism 12,14, engaged since the first and second drive disengaging mechanism 30,32 are de-activated. The drive mechanisms 12,14 are preferably steering clutch devices which are engaged by spring force and disengaged by the fluid operated mechanism 30,32. With the first and second control valves 22,24 in the first control positions 54,58 respectively, pressurized fluid from the pump 50 is supplied through the line 34, across the first control valve 22, into the line 38, and to the second control valve 24 where it is blocked. In a similar manner, pressurized fluid is supplied through the line 36, across the second control valve 24, into the line 40, and to the first control valve 22 where it is blocked. In the first control positions 54,58 of the control valves 22,24, the pressurized fluid cannot reach the first and second cylinders 66,68 to disengage the drive mechanism 12,14. With the control valves 22,24 in the first positions 54,58, the first and second brake mechanisms 16,18 are disengaged.

With reference to FIG. 2, the first control valve 22 is shown shifted to the second control position 56. Fluid from the pump 50 flows into the line 36, across the second control valve 24, into the line 40, through the first control valve 22, into the line 42, and into the first cylinder 66. The fluid in the cylinder 66 moves the piston 70 which disengages the first drive mechanism 12. The control valve 22 is moved from the first position 54 to the second position 56 by applying the first foot pedal 62, while the second foot pedal 62 has also activated the first brake mechanism 16. The fluid flowing into the line 34 is blocked at the first control valve 22.

With reference to FIG. 3, the second control valve 24 is shown to the second control position 60 by applying the second foot pedal 64, while the first foot pedal 62 remains inactive. Fluid from the pump 50 flows into the line 34, across the second control valve 24, into the line 44, and into the second cylinder 68. The fluid in the cylinder 68 moves the second piston 72 which disengages the second drive mechanism 14. During movement of the second control valve 24, the second foot pedal has also activated the second brake mechanism 18. The fluid flowing into the line 36 is blocked at the second control valve 24.

With reference to FIG. 4, both the first and second control valves 22,24 have been shifted to the second positions 56,60 by application of both the first and second foot pedals 62,64. Fluid from the pump 50 flows into the first and second fluid lines 34,36 and to the first and second fluid control valves 22,24 respectively. At the control valves 22,24, the first and second fluid lines 34,36 are blocked and the pressurized fluid cannot reach the cylinders 66,68. The first cylinders 66 is vented to the reservoir 52 through the fifth fluid line 42, through the first control valve 22, through the fourth fluid line 40, across the second control valve 24, and through the second drain line 76. In a similar manner, the second cylinder 68 is vented to the reservoir 52 through the sixth fluid line 44, through the second control valve 24, through the third fluid line 38, across the first control valve 22, and through the first drain line 74. The first and second drive disengaging mechanism 30,32 respectively to their de-activated positions. Application of both the first and second foot pedals 62,64 concurrently has activated both the first and second brake mechanism 16,18. The first and second drive mechanism 12,14, and the first and second brake mechanisms 16,18 will remain engaged until the first or second foot pedals 62,64 is released.

Other aspects, objects, and advantages of this invention can be obtained from a study of the drawings, the disclosure, and the appended claims.

I claim:

1. A fluid control circuit for controlling the disengagement of a drive mechanism and the engagement of a brake mechanism, comprising:
   a single source of pressurized fluid;
   first and second control valves, each having first and second control positions;
   first and second means for actuating respectively said first and second control valves;
   first and second drive mechanisms;
   first and second drive disengaging mechanisms;
   first and second drive mechanisms;
   first and second drive disengaging mechanisms;
   first and second brake mechanisms;
   first and second fluid lines connecting said fluid source respectively to said first and second control valves, third and fourth fluid lines connecting said first control valve to said second control valve, and fifth and sixth fluid lines connecting said first and second drive disengaging mechanisms respectively to said first and second control valves;
   first means for activating said first drive disengaging mechanism, including pressurized fluid routed to said first drive disengaging mechanism sequentially through said second control valve and said first control valve; and
   second means for activating said second drive disengaging mechanism, including pressurized fluid routed to said second drive disengaging mechanism sequentially through said first control valve and said second control valve.

2. A fluid control circuit, as set forth in claim 1, wherein said first and second actuating means includes first and second foot operated pedals.

3. A fluid control circuit, as set forth in claim 1, wherein said first and second drive disengaging mechanisms include first and second fluid actuated cylinders and pistons respectively.

4. A fluid control circuit, as set forth in claim 1, wherein said first and second brake mechanism are activated respectively when said first and second control valves are moved from said first positions to said second positions.

5. A fluid control circuit, as set forth in claim 1, wherein said first means for activating said first drive disengaging mechanism includes moving said first control valve to said second position.

6. A fluid control circuit, as set forth in claim 1, wherein said second means for activating said second drive disengaging mechanism includes moving said second control valve to said second position.

7. A fluid control circuit, as set forth in claim 1, wherein said first drive disengaging mechanism is activated only when said first control valve is in said second position and said second control valve is in said first position.

8. A fluid control circuit, as set forth in claim 1, wherein said second drive disengaging mechanism is activated only when said second control valve is in said second position and said first control valve is in said first position.

9. A fluid control circuit, comprising:
   a source of pressurized fluid, including a single fluid pump and a fluid reservoir;
   a first fluid control valve having first and second fluid control positions;
   a second fluid control valve having first and second fluid control positions;
   first and second valve actuating foot pedals connected respectively to said first and second fluid control valves;
   first and second drive mechanisms;
   first and second drive disconnecting devices, including first and second fluid actuated cylinders associated respectively with said drive disconnecting devices;
   first and second brake mechanisms connected respectively to said first and second foot pedals;
   first means for activating said first drive disconnecting device, including moving said first fluid control valve from said first position to said second position and supplying pressurized fluid from said source to said first cylinder;
   second means for activating said second drive disconnecting device, including moving said second fluid control valve from said first position to said second position and supplying pressurized fluid from said source to said second cylinder;
   said source of pressurized fluid being supplied to said first fluid cylinder when said first control valve is moved from said first position to said second position, said second control valve being in said first position;
   said source of pressurized fluid being supplied to said second fluid cylinder when said second control valve is moved from said first position to said second position, said first control valve being in said first position; and
   said source of pressurized fluid being blocked to said first and second cylinders when said first and second control valves are moved to said second control positions concurrently.

10. A fluid control circuit, as set forth in claim 9 wherein said first and second brake mechanisms are activated when said first and second control valves are in said second positions.

* * * * *

UNITED STATES PATENT AND TRADEMARK OFFICE
CERTIFICATE OF CORRECTION

PATENT NO.  : 5,058,717

DATED       : October 22, 1991

INVENTOR(S) : SAM N. HAGLUND

It is certified that error appears in the above-identified patent and that said Letters Patent is hereby corrected as shown below:

Claim 1, column 5, line 28: delete entire line

Claim 1, column 5, line 29: delete entire line

Signed and Sealed this

Second Day of March, 1993

Attest:

STEPHEN G. KUNIN

*Attesting Officer*     *Acting Commissioner of Patents and Trademarks*